United States Patent [19]

Stöger

[11] Patent Number: 5,757,593
[45] Date of Patent: May 26, 1998

[54] MAGNETIC-TYPE CASSETTE WITH A PAD HAVING A POLYTETRAFLUOROETHYLENE LAYER ANCHORED TO THE OPEN PORES OF A FOAM BASE

[75] Inventor: Anton Stöger, Vienna, Austria

[73] Assignee: U.S. Philips Corporation, New York, N.Y.

[21] Appl. No.: 627,557

[22] Filed: Apr. 4, 1996

[30] Foreign Application Priority Data

May 17, 1995 [EP] European Pat. Off. .............. 95201288

[51] Int. Cl.$^6$ ..................................................... G11B 15/60
[52] U.S. Cl. ..................................................... 360/130.33
[58] Field of Search ........................... 360/130.3–130.33, 360/128; 242/326.4

[56] References Cited

U.S. PATENT DOCUMENTS

| | | | |
|---|---|---|---|
| 3,682,486 | 8/1972 | Zwetzig et al. | 360/130.33 |
| 3,822,835 | 7/1974 | Shore | 242/55.19 |
| 4,612,593 | 9/1986 | Oishi | 360/130.31 |
| 4,669,020 | 5/1987 | Shepherd et al. | 360/130.33 |
| 4,796,135 | 1/1989 | Oishi | 360/130.33 |
| 4,922,361 | 5/1990 | Bordignon | 360/130.31 |

FOREIGN PATENT DOCUMENTS

| | | | |
|---|---|---|---|
| 58-3546 | 1/1983 | Japan | 360/130.31 |

OTHER PUBLICATIONS

Fisher et al, RCA Techincal Notes No. 1124, "Sponge Pad Design For Tape Cartridge ", Aug. 11, 1975.

*Primary Examiner*—Robert S. Tupper
*Assistant Examiner*—Brain E. Miller
*Attorney, Agent, or Firm*—Robert M. McDermott

[57] ABSTRACT

In a cassette for a magnetic tape, which has a housing with a housing wall formed with an access opening for a magnetic head, and a tape-pressure device including a pressure-pad support and, arranged thereon, a pressure pad having an elastic base of a foam material, the foam material has open pores at the surface region which faces the magnetic tape during pressing and a polytetrafluoroethylene layer is anchored in the open pores.

6 Claims, 4 Drawing Sheets

5,757,593

MAGNETIC-TYPE CASSETTE WITH A PAD HAVING A POLYTETRAFLUOROETHYLENE LAYER ANCHORED TO THE OPEN PORES OF A FOAM BASE

The invention relates to a cassette for a magnetic tape, comprising a housing having a housing wall along which a length of magnetic tape extends and which has an access opening for giving a magnetic head of a magnetic-tape apparatus access to the length of magnetic tape, and comprising a tape-pressure device for pressing the length of magnetic tape against a tape contact face of the magnetic head, which device comprises a pressure-pad support and a pressure pad arranged on the pressure-pad support and having an elastic base of a porous foam material with a surface region remote from the pressure-pad support, which surface region faces the length of magnetic tape during pressing and carries a polytetrafluoroethylene layer.

The invention also relates to a tape-pressure device for such a cassette, comprising a pressure-pad support and a pressure pad arranged on the pressure-pad support and having an elastic base of a porous foam material with a surface region remote from the pressure-pad support, which surface region carries a polytetrafluoroethylene layer.

The invention further relates to a pressure pad for such a tape-pressure device having an elastic base of a porous foam material with a surface region which carries a polytetrafluoroethylene layer.

A cassette of the type defined in the first paragraph, a tape-pressure device of the type defined in the second paragraph, and a pressure pad of the type defined in the third paragraph are known from, for example, U.S. Pat. No. 3,822,835.

The known cassette, the known tape-pressure device and the known pressure pad comprise a layer of polytetrafluoroethylene affixed to the foam base by means of an adhesive joint in a surface zone facing a magnetic tape portion during pressing. Such an adhesive joint requires an additional step in the production of the pressure pad and leads to an undesirable reduction of the elasticity and compliance of the pressure pad.

It is an object of the invention to preclude the above problems and to provide a magnetic-tape cassette in which the polytetrafluoroethylene layer is affixed to the base without an adhesive joint and without a reduction of the elasticity and compliance of the pressure pad. To this end, a cassette of the type defined in the first paragraph is characterized in that the foam material has pores which are open at the surface region and the polytetrafluoroethylene layer is anchored in the open pores. With such a construction of a cassette it is achieved that the polytetrafluoroethylene layer is anchored directly in the open pores of the foam material in that portions of the polytetrafluoroethylene layer interlock with the open pores and are thus retained.

It is to be noted that from U.S. Pat. No. 4,796,135 a magnetic-tape cassette is known, comprising a strip-shaped resilient pressure-pad support and a pressure pad connected to the pressure-pad support. The pressure pad comprises two layers, each consisting of carbon-containing porous polyethylene or of polytetrafluoroethylene, of which the outer layer, which in operation presses a magnetic tape against a magnetic head, has been impregnated with silicone oil and/or an antistatic fluid, and of which the inner other layer is affixed to the pressure-pad support by an adhesive layer. In this known arrangement the layers of polyethylene or of polytetrafluoroethylene are connected directly to the pressure-pad support via the adhesive layer. U.S. Pat. No. 4,796,135 giving no specification of the structure or composition of the connection between the adhesive layer and the polyethylene or polytetrafluoroethylene inner layer of the pressure pad, and this known arrangement does not include an elastic base of a porous foam having open pores at a surface region which faces the magnetic tape when the magnetic tape is pressed against a magnetic head, in which pores the layer of polytetrafluoroethylene interlocks, as is the case in a structure in accordance with the invention.

In a cassette in accordance with the invention it has proved to be advantageous if at the side of the base remote from the surface region and facing the pressure-pad support the base has a substrate for carrying the base and at the side remote from the base the substrate has an adhesive layer by means of which the pressure pad is affixed to the pressure-pad support. This has the advantage that it simplifies fastening of the pressure pad to the pressure-pad support. It is to be noted that the use of a substrate connected to a base of a porous foam material is known per se from the above-mentioned U.S. Pat. No. 3,822,835, but therein said substrate serves for direct mounting in a cassette and no references can be found to affix this substrate to a pressure-pad support by means of an adhesive layer.

According to the invention, a tape-pressure device of the type defined in the second paragraph is characterized in that the foam material has pores which are open at the surface region and the polytetrafluoroethylene layer is anchored in the open pores.

For such a tape-pressure device it has proved to be advantageous if at the side of the base remote from the surface region and facing the pressure-pad support the base has a substrate for carrying the base and at the side remote from the base the substrate has an adhesive layer by means of which the pressure pad is affixed to the pressure-pad support.

According to the invention, a pressure pad of the type defined in the third paragraph is characterized in that the foam material has pores which are open at the surface region and the polytetrafluoroethylene layer is anchored in the open pores.

For such a pressure pad it has proved to be advantageous if at the side of the base remote from the surface region the base has a substrate for carrying the base and at the side remote from the base the substrate has an adhesive layer.

The invention will now be described in more detail with reference to the drawings which show an exemplary embodiment to which the invention is not limited.

Figure 1:
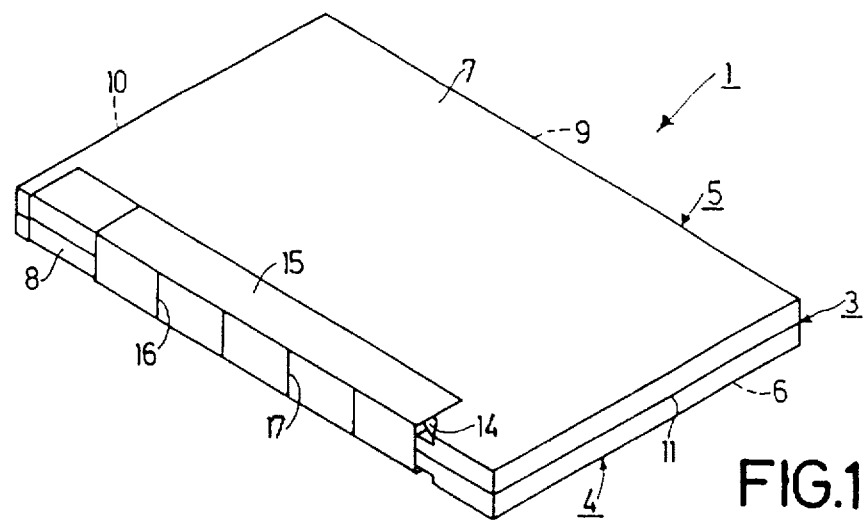
FIG. 1 is a diagrammatic oblique view of a magnetic-tape cassette having a shutter which is movable along a first long side wall between a closed position and an open position to cover access openings provided in the first long side wall, the shutter being shown in its closed position.
Figure 2:
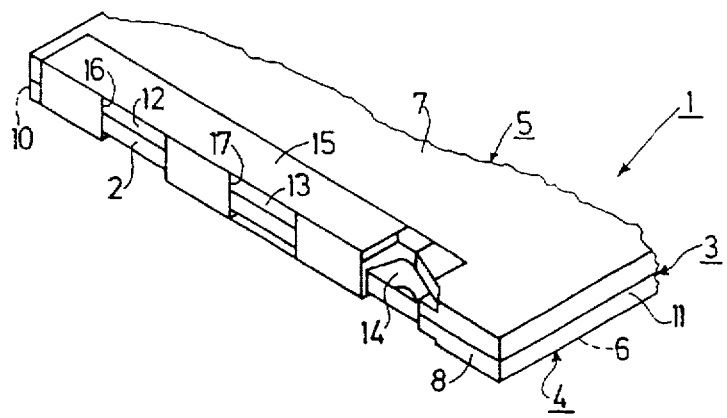
FIG. 2 shows the cassette of FIG. 1 in the same way as in FIG. 1, the cassette being partly cut-away and the shutter being shown in its open position.
Figure 3:
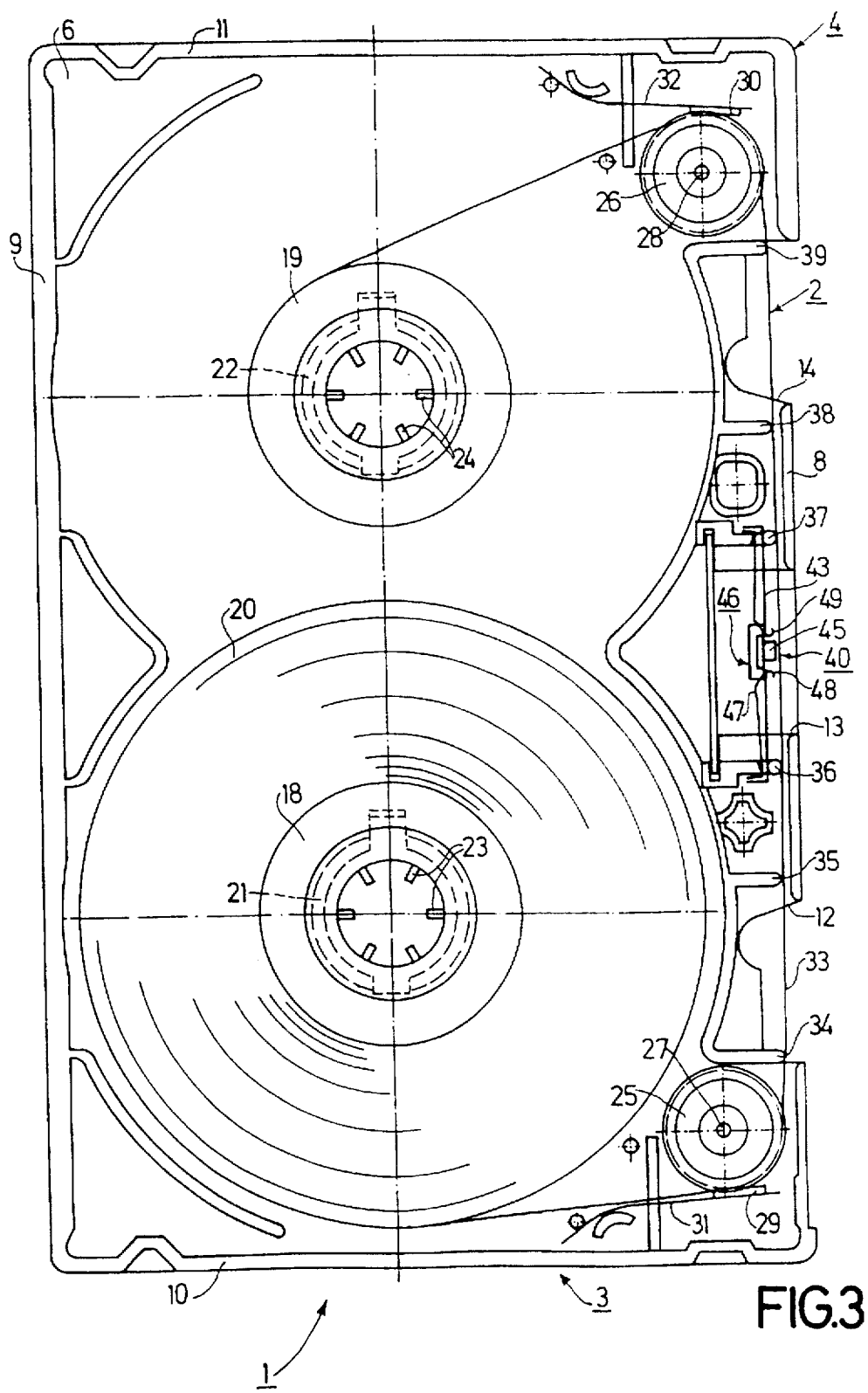

FIG. 3 is a plan view to approximately twice full scale, showing a trough-shaped lower housing half of the cassette of FIGS. 1 and 2, in which housing half two reel hubs with the magnetic tape between these hubs, a tape-pressure device with a pressure-pad support and a pressure pad, as well as a tape-guide device with a tape-guide-element support and two tape-guide elements are arranged adjacent one another at the location of a central access opening.

Figure 4:
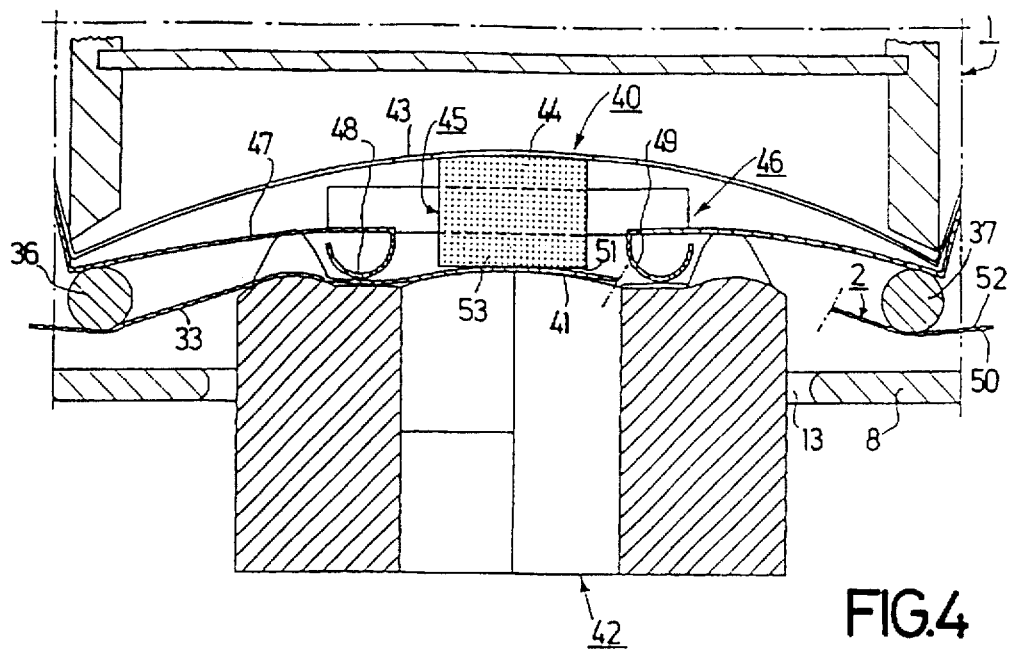

FIG. 4 shows a part of the cassette of FIGS. 1, 2 and 3 comprising the tape-pressure device and the tape-guide device to a larger scale than FIG. 3, the pressure pad of the tape-pressure device and the two tape-guide elements of the tape-guide device cooperating with a magnetic head which has entered through the central access opening.

Figure 5:
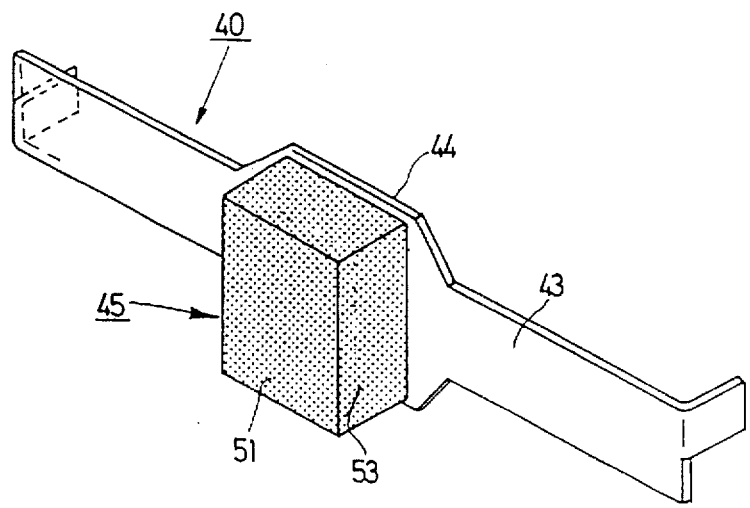

FIG. 5 is an oblique view to a larger than fall scale, showing the tape-pressure device of the cassette shown in FIGS. 1 to 4.

Figure 6:
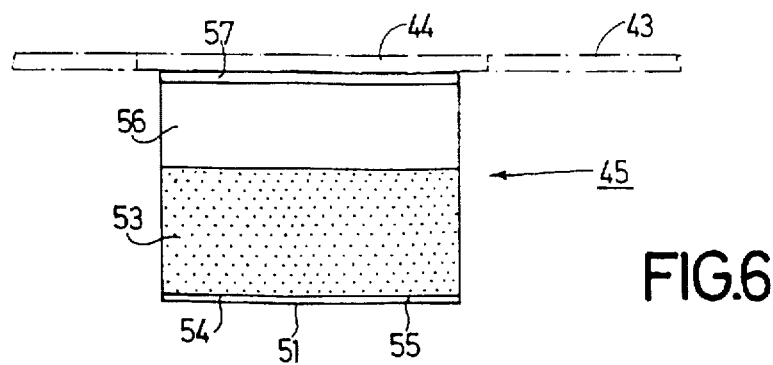

FIG. 6 is a diagrammatic plan view of pressure pad of the tape-pressure device shown in FIG. 5, illustrating the layer structure of the pressure pad.

Figure 7:
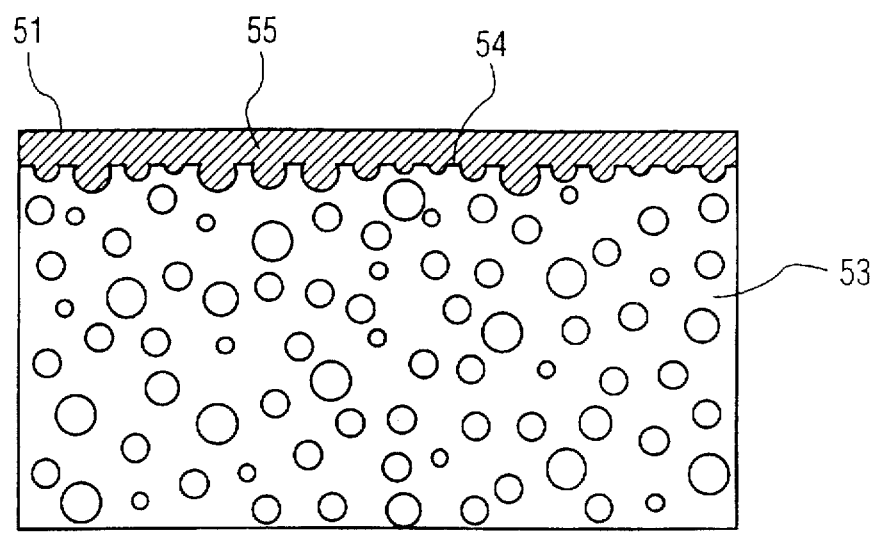

FIG. 7 is a diagrammatic plan view of the foam and PTFE layers of the pressure pad.

FIGS. 1 and 2 show a cassette 1 for accommodating a magnetic tape 2. The cassette 1 has a rectangular housing 3 comprising a lower trough-shaped housing half 4 and an upper trough-shaped housing half 5. The housing 3 has a lower wall 6, not shown in FIGS. 1 and 2, an upper wall 7, a first long side wall 8, which faces a second long side wall 9, not shown in FIGS. 1 and 2, a first short side wall 10, not shown in FIGS. 1 and 2, and a second short side wall 11. The first long side wall 8 has three openings 12, 13 and 14. The opening 12 extends also into the lower wall 6 of the housing 3 of the cassette 1. In addition, the opening 14 extends into the lower wall 6 and into the upper wall 7 of the housing 3 of the cassette 1. The openings 12, 13 and 14 form access openings giving access to the magnetic tape 2 in the cassette 1, the central access opening 13 allowing a magnetic head, not shown, to enter the cassette 1 for scanning the magnetic tape 2. In order to close the access openings 12, 13 and 14 the cassette 1 has a shutter 15 of substantially U-shaped cross-section, which shutter is guided on the housing 3 of the cassette 1 so as to be movable between a closed position shown in FIG. 1 and an open position shown in FIG. 2, a return spring, not shown, acting upon the shutter 15 to urge this shutter into its closed position shown in FIG. 1. The shutter 15 has two openings 16 and 17 through which the access openings 12 and 13 in the first long side wall 8 of the housing 3 of the cassette 1 are accessible when the shutter 15 is in its open position, the access opening 14 then also being accessible.

As is shown in FIG. 3, the cassette 1 shown in FIGS. 1 and 2 accommodates two juxtaposed reel hubs 18 and 19 which are rotatably mounted relative to the lower wall 6 and the upper wall 7, the magnetic tape 2 being wound completely onto the reel hub 18 to form a tape spool 20 in the situation illustrated in FIG. 3. At both ends the magnetic tape 2 is attached to a length of leader tape, not shown. One length of leader tape is connected to the reel hub 18 and the other length of leader tape is connected to the reel hub 19 in a manner, not shown. For rotatably mounting the two reel hubs 18 and 19 substantially ring-shaped ridges project from the lower wall 6 and the upper wall 7, the ridges provided on the lower housing half 4 bearing the reference numerals 21 and 22 in FIG. 3. Inner portions of the reel hubs 18 and 19, which are also substantially ring-shaped, carry pin-shaped inward projections 23 and 24 adapted to cooperate with reel spindles of a recording and reproducing apparatus constructed for cooperation with the cassette 1.

The cassette 1 further has two tape-guide rollers 25 and 26 arranged in the area of the ends of the first long side wall 8 and extending perpendicularly to the lower wall 6 and the upper wall 7, which tape-guide rollers are each rotatably supported on a mounting pin 27 and 28, respectively, which project perpendicularly from the lower wall 6. The magnetic tape 2 is pressed against each of the two tape-guide rollers 25 and 26 by a cleaning pad 29 and 30, respectively, which are each carried by a blade spring 31 and 32, respectively, supported in the lower housing half 4.

Between the two tape-guide rollers 25 and 26 a length 33 of magnetic tape 2 extends along the first long side wall 8.

In addition to the two tape-guide rollers 25 and 26 guide ribs 38 and 39, extending perpendicularly to the lower wall 6 of the lower housing half 4, have been provided to guide the length of tape 33.

As is apparent from FIGS. 3 and 4, the cassette 1 comprises a tape-pressure device 40 for pressing the length 33 of magnetic tape 2 against a tape contact face 41 of a magnetic head 42. The tape-pressure device 40 is movable between a rest position shown in FIG. 3 and a contact position shown in FIG. 4. The tape-pressure device 40 comprises an elongate strip-shaped blade-spring-like pressure-pad support 43 having a widened central portion 44 carrying a block-shaped pressure pad 45.

The cassette 1 further comprises a tape-guide device 46, which is also movable between a rest position shown in FIG. 3 and an operating position shown in FIG. 4. The tape-guide device 46 comprises an elongate strip-shaped blade-spring-like tape-guide-element support 47 having two rounded bent portions 48 and 49 forming tape-guide elements.

When the cassette 1 has been loaded into a magnetic-tape apparatus, as is shown in FIG. 4, the magnetic head 42 enters the cassette 1 through the access opening 13. The length 33 of magnetic tape 2 is then pressed with its coating side 50 against the tape contact face 41 of the magnetic head 42 by the two tape-guide elements 48 and 49 and the pressure pad 45, the two tape-guide elements 48, 49 and the pressure pad 45, with its surface region 51 facing the length 33 of magnetic tape 2, cooperating with the back 52 of the length 33 of magnetic tape 2.

As is apparent from FIG. 6, the pressure pad 45 comprises an elastic base 53 consisting of a porous foam material with a surface region 54 remote from the pressure-pad support 43, shown in dash-dot lines in FIG. 6, which surface region faces the length 33 of magnetic tape 2 when this tape is pressed against the tape contact face 41 of the magnetic head 42.

The construction of the pressure pad 45 is shown in detail in FIG. 6. As already stated, the pressure pad 45 includes an elastic base 53 of a porous foam material. In the present cassette the construction is such that the foam material of the base 53 has basically closed pores, as is known from and customary for foam materials, but has open pores at the surface region 54 remote from the pressure-pad support 43, which surface region faces the length 33 of magnetic tape 2 during pressing, and the polytetrafluoroethylene layer 55 is anchored in the open pores in an interlocking fashion, as shown in FIG. 7. The free surface region of the polytetrafluoroethylene layer 55 then forms the surface region 51 of the pressure pad 45 which contacts the back 52 of the length 33 of magnetic tape 2 when the coating side of this length 33 of magnetic tape 2 is pressed against the tape contact face 41 of a magnetic head 42. To carry the elastic base 53 of the pressure pad 45 the base 53 has been provided with a substrate 56 at its side which is remote from the open-pore surface region 54 and which faces the pressure-pad support 43. The substrate 56 may consist of a material on the basis of styrol, as is known from U.S. Pat. No. 3,822,835, but it may alternatively consist of another less hard material, as in the case of the pressure pad 45 shown in FIG. 6. At the side of the substrate 56 which is remote from the base 53 the pressure pad 45 has an adhesive layer 57 by means of which the pressure pad 45 can be or has been affixed to the pressure-pad support 43.

In the case of the pressure pad 45 described with reference to FIG. 6, which has a layer structure, the individual layers of this pressure pad 45 may have the following thicknesses. The adhesive layer 57 may have a thickness of, for example, 0.1 mm.

The thickness of the substrate 56 may be, for example, 0.8 mm. The base 53 may have a layer thickness of, for example, 1.0 to 1.1 mm. The thickness of the polytetrafluoroethylene layer 55 may be, for example, 0.05 to 0.1 mm.

When such a pressure pad is used in a magnetic-tape cassette this has the advantage that a length of magnetic tape is pressed against a magnetic head in a particularly uniform manner and with a uniform pressure distribution, a particularly low friction occurs between the active surface of the pressure pad and the magnetic tape, and there is hardly any difference between the static friction and the sliding friction of the surface region of the pressure pad which cooperates with the magnetic tape, which precludes the effects of irregular friction on the magnetic tape and, as a consequence, slipstick effects and thereby guarantees a uniform movement of the magnetic tape over the tape contact face of a magnetic head. These advantages are obtained by the provision of the polytetrafluoroethylene layer, which in a particularly simple and advantageous manner is anchored directly and without any additional means in the open pores of the foam material of the pressure pad, whose other pores are closed, in that portions of the polytetrafluoroethylene layer interlock with the open pores and are thus retained.

I claim:

1. A cassette for a magnetic tape, comprising a housing having a housing wall along which a length of magnetic tape extends and which has an access opening for giving a magnetic head of a magnetic-tape apparatus access to the length of magnetic tape, and comprising a tape-pressure device for pressing the length of magnetic tape against a tape contact face of the magnetic head, which device comprises a pressure-pad support and a pressure pad arranged on the pressure-pad support and having an elastic base of a porous foam material with a surface region remote from the pressure-pad support, which surface region faces the length of magnetic tape during pressing and carries a polytetrafluoroethylene layer, characterized in that the foam material has pores which are open at the surface region and the polytetrafluoroethylene layer extends into said pores and is thereby anchored in the open pores without the use of an adhesive.

2. A cassette as claimed in claim 1, characterized in that at the side of the base remote from the surface region and facing the pressure-pad support the base has a substrate for carrying the base and at the side remote from the base the substrate has an adhesive layer by means of which the pressure pad is affixed to the pressure-pad support.

3. A tape-pressure device for a cassette, comprising a pressure-pad support and a pressure pad arranged on the pressure-pad support and having an elastic base of a porous foam material with a surface region remote from the pressure-pad support, which surface region carries a polytetrafluoroethylene layer, characterized in that the foam material has pores which are open at the surface region and the polytetrafluoroethylene layer extends into said pores and is thereby anchored in the open pores without the use of an adhesive.

4. A tape-pressure device as claimed in claim 3, characterized in that at the side of the base remote from the surface region and facing the pressure-pad support the base has a substrate for carrying the base and at the side remote from the base the substrate has an adhesive layer by means of which the pressure pad is affixed to the pressure-pad support.

5. A pressure pad for a tape-pressure device having an elastic base of a porous foam material with a surface region which carries a polytetrafluoroethylene layer, characterized in that the foam material has pores which are open at the surface region and the polytetrafluoroethylene layer extends into said pores and is thereby anchored in the open pores without the use of an adhesive.

6. A pressure pad as claimed in claim 5, characterized in that at the side of the base remote from the surface region the base has a substrate for carrying the base and at the side remote from the base the substrate has an adhesive layer.

* * * * *